United States Patent [19]
Fricko

[11] 3,866,975
[45] Feb. 18, 1975

[54] VEHICLE OCCUPANT RESTRAINT BELT SYSTEM WITH COMFORT CLIP ASSEMBLY

[75] Inventor: John J. Fricko, Harper Woods, Mich.

[73] Assignee: General Motors Corporation, Detroit, Mich.

[22] Filed: Feb. 6, 1974

[21] Appl. No.: 439,893

[52] U.S. Cl............ 297/388, 280/150 SB, 297/389
[51] Int. Cl............................................. A62b 35/00
[58] Field of Search...... 297/389, 388; 24/168, 163, 24/164, 194; 280/150 SB; 242/107.2

[56] References Cited
UNITED STATES PATENTS

| | | | |
|---|---|---|---|
| 2,260,378 | 10/1941 | Hoffland.............................. | 24/194 |
| 2,465,787 | 3/1949 | Bliek................................... | 24/49 |
| 2,569,750 | 10/1951 | Dillenz................................. | 24/194 |
| 3,531,060 | 9/1970 | Foster................................. | 242/107.2 |
| 3,620,569 | 11/1971 | Mathis................................. | 297/389 |
| 3,646,644 | 3/1972 | Watts.................................. | 297/388 |
| 3,695,696 | 10/1972 | Lohr et al............................ | 297/388 |
| 3,695,697 | 10/1972 | Stoffel................................. | 297/389 |

Primary Examiner—Roy D. Frazier
Assistant Examiner—Darrell Marquette
Attorney, Agent, or Firm—J. A. Kushman

[57] ABSTRACT

An automotive vehicle occupant restraint belt system includes lap and shoulder belts with first ends connected to a common D-ring that is selectively attached to a buckle to secure the belt system in an occupant restraining position. The other end of the lap belt is received by an automatic locking type retractor and the other end of the shoulder belt is received by an inertia type locking retractor after first passing through a stop mounted on the seat back of the seat with which the belt system is associated. The retractors normally tension the belts across the occupant's lap and chest while in the restraining position. A plastic comfort clip assembly of a two-piece construction is slidably positioned in an adjustable manner along an intermediate portion of the shoulder belt between the D-ring and the stop so as to engage the stop and prevent the inertia retractor from tensioning the shoulder belt across the occupant's chest. This assembly includes a plastic comfort clip with a rectangular base extending between the opposite edges of the shoulder belt and integrally supporting clamping portions that extend about the edges of the belt back toward each other so as to define a slot extending longitudinally with respect to the belt. The intermediate shoulder belt portion is inserted into the clip through the slot, and a plastic retainer of the clip assembly includes a generally planar base that is inserted between the clip clamping portions and the belt to hold the clip on the belt by preventing belt movement back through the slot of the clip. A pair of flanges on the ends of the base of the retainer engage the clamping portions of the clip so that the retainer moves with the comfort clip during slidable adjustment of the clip assembly in either direction along the shoulder belt. In a modified embodiment, the base of the retainer includes two slots that allow the ends of the clamping portions on the clip to directly engage the belt while the portion of the retainer base between its slots closes the slot of the clip to hold the clip assembly on the belt.

3 Claims, 6 Drawing Figures

VEHICLE OCCUPANT RESTRAINT BELT SYSTEM WITH COMFORT CLIP ASSEMBLY

BACKGROUND OF THE INVENTION

This invention relates generally to restraint belt systems for use within automotive vehicles so as to restrain vehicle occupants in seated positions.

Automotive vehicle occupant restraint belt systems generally utilize restraint belts of suitable webbing material that is approximately two inches wide and one sixteenth of an inch thick. Prior belt restraint systems have utilized these belts across both the occupant's lap and chest so as to prevent upper torso movement in addition to movement of the lower portion of the torso. To prevent these belt systems from giving the vehicles a cluttered appearance, the ends of the belts are generally received by belt retractors so as to wind the belts within reels of the retractors when not in use. This winding thus stores the unused belts and gives the vehicle an aesthetically appealing appearance. These retractors have been of the automatic locking type so as to lock the belt against pull out upon the initial winding of the belt after being pulled from a fully stored condition. The retractors have also been of the inertia type so that the belt is locked against pull out in response to abrupt belt pulls and/or in response to abrupt vehicle acceleration or deceleration.

Various devices and arrangements have been utilized in vehicle occupant restraint belt systems to prevent the winding bias of the associated belt retractors from applying tension directly across the occupant's body. The copending application of Garvey Ser. No. 421,213, filed on Dec. 3, 1973 and assigned to the assignee of the present invention, discloses such a device in which a one-piece plastic comfort clip adjustably positioned along the length of the shoulder belt engages a stop through which the shoulder belt extends to prevent the retractor of the shoulder belt from tensioning the shoulder belt across a user's chest.

SUMMARY OF THE INVENTION

This invention provides an improved automotive vehicle restraint belt system with lap and shoulder belts having ends connected to a common component of a buckle arrangement that is selectively attached to another such component so as to secure the belt system in an occupant restraining position, with an automatic locking type belt retractor receiving the other end of the lap belt so as to normally tension this belt across the occupant's lap, with an inertia locking type retractor receiving the other end of the shoulder belt so as to normally tension this belt across the occupant's chest, and with a stop through which the shoulder belt extends so as to be cooperable with a two-piece comfort clip assembly positioned along the shoulder belt to prevent the shoulder belt retractor from tensioning the shoulder belt across the occupant's chest.

One feature of the invention is that the two-piece comfort clip assembly includes an integral plastic comfort clip with a base that extends between the edges of the belt and supports integral clamping portions that extend around the belt edges back toward each other so as to define a slot through which the belt is inserted, and a plastic retainer of the assembly is inserted between the shoulder belt and the clamping portions of the clip to close the clip slot and thereby prevent belt movement back through the slot so that the clip is held on the belt. Another feature of the invention is that the plastic retainer includes a generally planar base that is received between the clamping portions of the clip and the shoulder belt to close the clip slot, and a pair of flanges on the ends of the retainer base engage the clamping portions of the clip so that the retainer moves with the comfort clip during slidable adjustment of the clip assembly in either direction along the shoulder belt. Another feature of the invention is that the base of the retainer may define two slots so that the ends of the clamping portions of the clip directly engage the shoulder belt with the retainer base portion between its slots closing the slot of the clip.

BRIEF DESCRIPTION OF THE DRAWINGS

The above-specified features and other features, objects and advantages of the automotive vehicle restraint belt system of this invention are readily apparent from the following detailed description of the preferred embodiment and the drawings in which.

DETAILED DESCRIPTION OF THE PREFERRED EMBODIMENT

Figure 1:
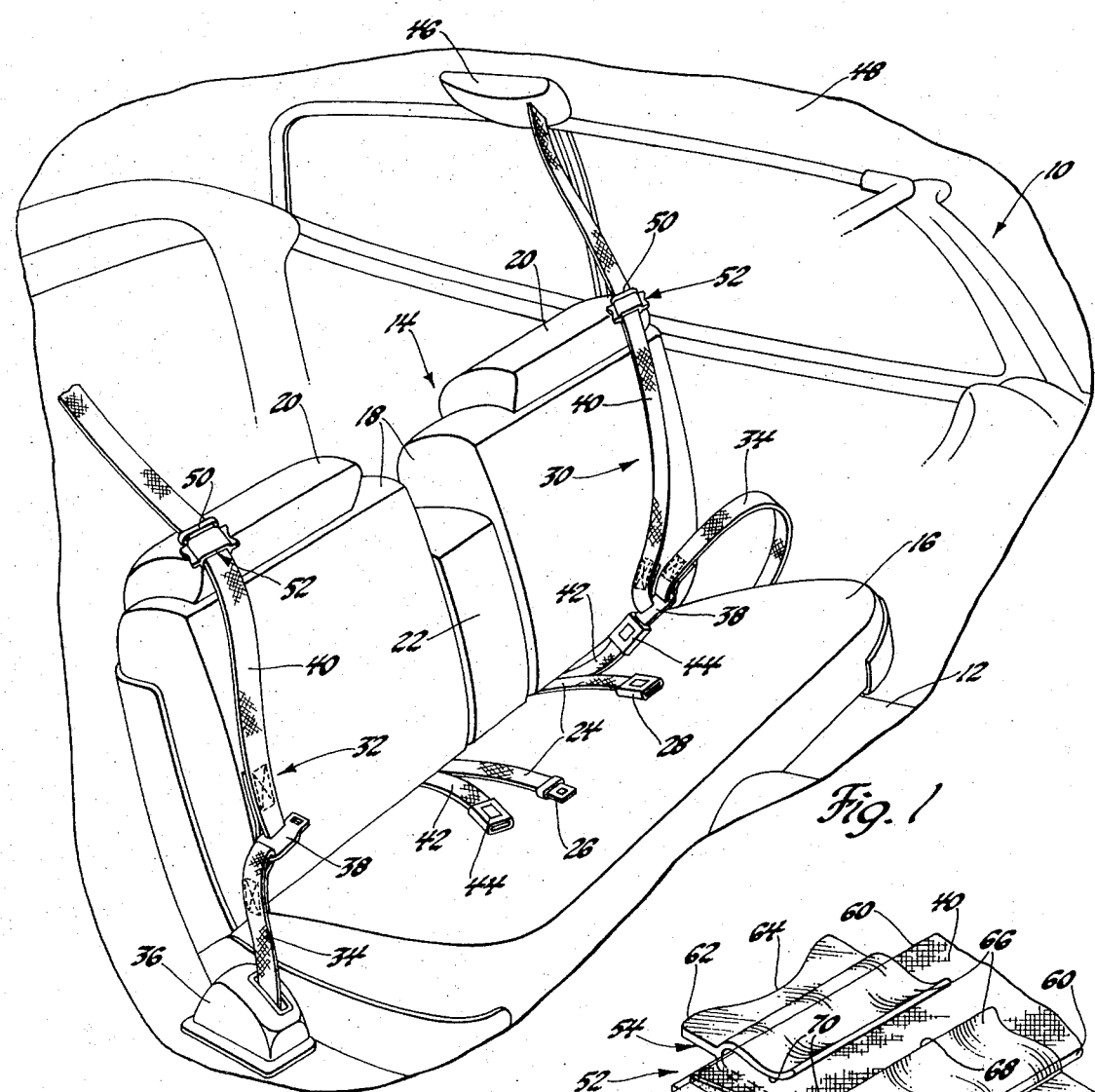
FIG. 1 is a perspective view of the interior of an automotive vehicle whose front seat utilizes a pair of restraint belt systems constructed in a manner according to this invention.

Referring generally to FIG. 1 of the drawings, the interior occupant compartment of an automotive vehicle 10 is shown as including a floor 12 which conventionally mounts a front bench type seat 14 by way of seat adjusters which are not shown. Seat 14 includes a conventional seat cushion 16 and a pair of seat backs 18 for the vehicle driver and the outboard front seat passenger. The upper ends of seat backs 18 support headrests 20 for the driver and outboard seat passenger. Between the seat backs 18, a somewhat smaller seat back 22 is positioned for use by a center passenger of the seat. This seat back 22 may also be tipped forwardly to provide a console between the driver and outboard passenger when the seat need only accommodate two occupants. When being used by three occupants, the center passenger utilizes two lap belt portions 24 whose free ends respectively attach a male D-ring 26 and a female buckle 28. The D-ring 26 is selectively attached and detached from the buckle 28 so as to selectively secure the lap belt portions 24 about the center seat passenger in a restraining position.

A pair of restraint belt systems for the driver and the outboard front seat passenger are respectively indicated by 30 and 32 and are constructed in a manner according to this invention. The restraint belt system 30 for the driver is shown positioned in an occupant restraining position while the restraint belt system 32 for the passenger is shown in a storage position. These two restraint belt systems are, however, identical to each other except for being symmetrical about a vertical plane that extends through the central portion of the vehicle between the forward and rearward vehicle ends.

The restraint belt systems 30 and 32 will now be described using like numerals for like components of each of the systems. Each belt system includes a lap belt 34 whose lower end is received by an automatic locking type retractor 36, only one shown, positioned on the vehicle floor 12 adjacent the outboard end of the vehicle seat cushion 16. This type of retractor normally pulls the lap belt 34 toward a stored position within the retractor by a spring biased belt reel and allows the lap belt to be pulled out from the retractor only from a fully wound condition. Upon the initial retracting of the lap belt from an unwound condition, the retractor automatically locks and will not allow the belt to be pulled out further until it is again fully stored within the retractor. This type of retractor is well known in the automotive vehicle occupant restraint belt art and is thus not being described herein in detail. The other end of each lap belt 34 is looped through an aperture in a male buckle component or D-ring 38 and is then stitched to itself so as to secure the lap belt to the D-ring.

Each restraint belt system 30 and 32 also includes a shoulder belt 40 whose lower end is likewise looped through an aperture in the associated D-ring 38 and stitched to itself so as to provide attachment to the D-ring. Adjacent the lap belt portions 24 for the center seat occupant, the outboard restraint belt systems 30 and 32 each include short lengths of belt 42 that pass through the juncture between the seat cushion 16 and the respective seat backs 18 so as to be secured to the vehicle floor 12 behind seat 14. The forward ends of these belts 42 attach respective buckle components or female buckles 44 that selectively receive the D-rings 38 so as to secure the restraint belt systems 30 and 32 in occupant restraining positions such as shown by the driver belt system 30. In this restraining position, the lap belts 34 extend laterally with respect to the vehicle across the user's laps while the shoulder belts 40 extend diagonally across the users' chests passing over the outboard shoulder. The upper ends of the shoulder belts 40 are received by inertia type belt retractors 46, only one shown, mounted on the outboard edges 48 of the roof above and to the rear of seat 14 at the outboard sides of the ends of the seat. These retractors are preferably of the type which lock in response to abrupt acceleration or deceleration of the vehicle in any horizontal direction. They may also be of the type in which locking is responsive to abrupt pull out of the associated shoulder belts. Nevertheless, regardless of which type of inertia retractor is used, the shoulder belt retractors 46 pull the shoulder belts upwardly and rearwardly across the user's chest while the lap belt retractors 36 pull the lap belts 34 across the user's lap.

The shoulder belts 40 extend between the roof mounted retractors 46 and the D-rings 38 and pass through guides or stops 50 mounted on the outboard ends of the headrests carried by the seat backs 18. The shoulder belts 40 slide freely in both directions through stops 50 and are thus readily moved against the pull of the retractors 46 to the restraining position shown by restraint belt system 30 as well as being readily retracted to the storage position back through the stops. The shoulder and lap belts are pulled into their respective retractors for storage only upon detachment of the D-rings 38 from their associated buckles 44. In this storage condition as shown by belt system 32, the interconnected lap and shoulder belts extend generally vertically between the lap belt retractor 36 and the seat back mounted stop 50, and the shoulder belt extends rearwardly and upwardly from stop 50 to the roof mounted shoulder belt retractor 46.

Figure 2:
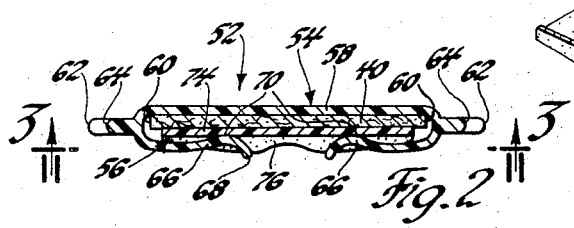
FIG. 2 is an enlarged sectional view through the shoulder belt of one of the belt systems and shows the configuration of a two-piece comfort clip assembly utilized on this shoulder belt so as to engage a seat back mounted stop through which the shoulder belt extends so that this engagement prevents the retractor for the shoulder belt from tensioning this belt across a user's chest.
Figure 3:
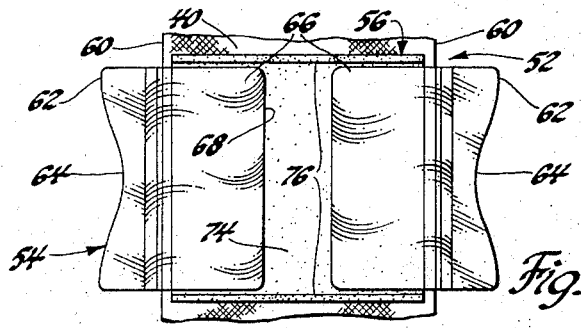
FIG. 3 is a view of the shoulder belt and comfort clip assembly taken along line 3—3 of FIG. 2.
Figure 4:
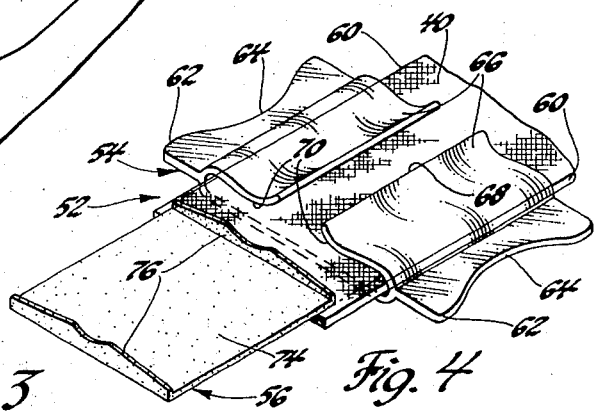
FIG. 4 is a perspective view of the shoulder belt and comfort clip prior to the insertion of a retainer of the clip assembly to a position between the shoulder belt and clamping portions of the clip.

A two-piece clip assembly 52 of this invention is mounted on each shoulder belt 40 between the associated D-ring 38 and seat back mounted stop 50. This comfort clip assembly, as can be seen in FIGS. 2 - 4, includes a plastic comfort clip 54 and a plastic retainer 56. The comfort clip 54 includes a generally rectangular base 58, FIG. 2, that extends laterally between the opposite edges 60 of the shoulder belt 40, and integrally supports a pair of wings 62 that project laterally outward with respect to the belt 40. These wings have inwardly extending depressions 64 that allow the comfort clip assembly 52 to be manually grasped and slid along belt 40 in a manner that will be described later. The comfort clip 54 also includes a pair of clamping portions 66 that are integrally supported by the respective ends of the clip base 58 and extend around the belt edges 60 back toward each other. The clamping portions, when viewed as in FIG. 2, have ogee configurations that terminate short of each other so as to define a slot 68 which extends parallel to the longitudinal axis of belt 40 as best seen in FIGS. 3 and 4. The inner ends of the clamping portions 66 define surfaces 70 that oppose the base 58 and have somewhat arcuate configurations when viewed as in FIG. 2. These arcuate surfaces extend parallel with respect to the longitudinal axis of belt 40 in a rectilinear manner.

The plastic retainer 56 of the clip assembly is best seen in FIG. 4, and includes a generally planar base 74 of a rectangular configuration, and a pair of integral upstanding flanges 76 on the ends of the base so as to be spaced from each other slightly more than the width of the comfort clip 54. After the comfort clip 54 is first mounted on the shoulder belt 40 by insertion of an intermediate portion of the shoulder belt through the clip slot 68 so as to be located between the clip base 58 and clamping portions 66, the retainer 56 is positioned as shown in FIG. 4 ready for insertion between the shoulder belt 40 and the clamping portions 66 of the clip. The clamping portions 66 are then flexed away from the clip base 58 either manually or by way of a suitable tool so that the retainer flange 76 closest to the clip in FIG. 4 may be positioned between the clamping portions 66 of the clip and the adjacent side of the shoulder belt 40. The retainer is then slid along the clip so that the mentioned flange thereof moves past the other end of the clip and allows the clamping portions of the clip to snap into engagement with the base of the retainer. This engagement, as seen in FIG. 2, is at the arcuate surfaces 70 on the clamping portions of the clip and forces the retainer to clamp the shoulder belt against the base 58 of the clip. The retainer also closes the slot 68 between the ends of the clip portions so that the clip is held on the shoulder belt 40 by preventing the belt from moving back through the slot.

The clamping force exerted on the shoulder belt 40 by the clip assembly 52 is not too large to prevent the clip assembly from being manually slid along the shoulder belt in a manner that provides adjustment thereof along the length of the belt. However, this clamping force is large enough to prevent the shoulder belt retractor from pulling the shoulder belt through the clip assembly when the wings 62 of the comfort clip engage the stop 50 on the seat back 18. Thus, appropriate manual adjustment of the clip assembly 52 along the shoulder belt causes the clip assembly to engage the seat back stop 50 in a manner that relieves the occupant of the winding belt bias of the retractor 46 so that the shoulder belt is not tensioned diagonally across the occupant's chest. Also, the retainer 56 of the clip assembly ensures that the clip assembly will be held on the shoulder belt, for the reasons previously mentioned, so that the belt system will continue to function without shoulder belt tension on the belt user. During the adjustment of the clip assembly along the shoulder belt in either direction, one of the flanges 76 of the retainer will engage the clamping portions 66 of clip 54 so as to maintain the retainer in position with respect to the clip. Were these retainer flanges not incorporated, the retainer might slide out of position with respect to the clip and thus would not continue to hold the clip assembly on the belt.

The degree of clamping force the clip assembly 52 exerts on the shoulder belt depends on the thickness of the belt, the thickness of the retainer base 74, the normal distance between the clip base 58 and the arcuate surfaces 70 of the clip clamping portions 66 in an undeflected state, the force required to deflect the clip clamping portions 66 away from the base 58 a sufficient distance to receive the retainer base and the shoulder belt, and the coefficient of friction between the belt and the clip assembly during adjustment of the clip assembly along the belt. This clamping force must be balanced against the pull exerted on the shoulder belt 40 by its inertia retractor 46 in the above-described manner so that the clip assembly 52 functions effectively with the belt system. This relationship of the clamping force of the clip assembly 52 with respect to the belt pull exerted by the inertia retractor 46 thus must be maintained in order for the belt system to be operable in the manner intended.

Figure 5:
FIG. 5 is a view similar to FIG. 2 of a modified embodiment of the clip assembly in which the retainer defines slots that allow the clamping portions of the clip to directly engage the shoulder belt.
Figure 6:
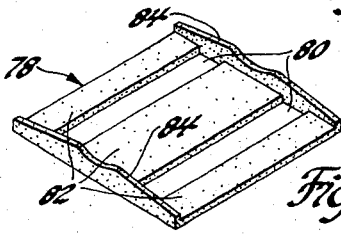
FIG. 6 is a perspective view of the modified retainer of the clip assembly shown in FIG. 5.

FIGS. 5 and 6 show a modified embodiment of the retainer for the clip assembly and this retainer is indicated generally by 78. This retainer differs from the other retainer 56 by the provision of a pair of slots 80 in its base 82. The slots extend in a direction that is parallel with the longitudinal axis of the shoulder belt and reach between the upstanding flanges 84 of the retainer which lock the retainer for movement with the clip. The retainer thus has a shape like a Roman numeral III, and in its assembled position to the comfort clip 54, the ends of the clip clamping portions 66 are received by the slots 80 as shown in FIG. 5. The arcuate surfaces 70 of the clamping portions are thus free to directly engage the shoulder belt 40 and to clamp the belt against the clip base 58.

The slots 80 in the modified embodiment of the retainer result in a material savings when the retainer is injection molded from plastic. The considerations controlling the clamping force exerted on the shoulder belt change to some degree with this modified embodiment since the thickness of the retainer is not then between the clip base and clamping portions, and the clamping portions then directly engage the shoulder belt. Also, since the arcuate surfaces 70 of clip clamping portions 66 are received within the slots 80 of the retainer 78, engagement of the ends of these retainer slots with clip clamping portions will cause the retainer to move with the clip during adjustment of the clip assembly along the belt in either direction. The ends of retainer slots 80 may be formed by the upstanding flanges 84 to provide this engagement with the clip clamping portions. These slot ends may also be formed by extending the retainer base 82 longitudinally with respect to the belt. The upstanding flanges 84 may then be removed and the retainer will then be easier to insert into position since the clamping portions 66 of the clip will not have to be flexed as much.

Preferably, the comfort clip 54 and its retainer 56 or 78 are injection molded so as to provide an economical clip assembly. Also, if the clip 54 is injection molded from a clear plastic, it is not necessary to color code the clips to match with shoulder belts or vehicle interiors of different colors. The retainers 56 and 78 are, however, hidden from a vehicle occupant's view and thus do not necessarily have to be color coordinated with the rest of the vehicle interior. Therefore, it is possible to use a single color plastic, such as a white plastic, for the material that is used to mold the retainers. They, of course, may be molded of a clear plastic like the clip 54.

It is believed evident that the foregoing description describes an improved automotive vehicle occupant restraint belt system.

What is claimed is:

1. In an automotive vehicle including an occupant seat having cushion and back portions, a restraint belt system for a seated occupant comprising:

lap and shoulder belts, a common first buckle component secured to adjacent first ends of the lap and shoulder belts, a second buckle component for selectively attaching the first buckle component so as to secure the belts in an occupant restraining position, the lap belt extending generally laterally with respect to the vehicle across the occupant's lap while in the restraining position, and the shoulder belt extending diagonally across the occupant's chest while in the restraining position;

means attaching the other end of the lap belt so as to secure the lap belt in the occupant restraining position;

an inertia locking type belt retractor receiving the other end of the shoulder belt so as to normally tension the shoulder belt across the chest of the belted occupant and to store the shoulder belt upon detachment of the buckle components;

a stop through which the shoulder belt passes, the stop being located toward the shoulder belt retractor with respect to the shoulder of the belted occupant over which the shoulder belt passes while extending diagonally across the occupant's chest in the restraining position, and the stop allowing the shoulder belt to be freely pulled in either direction therethrough so that the shoulder belt is not impeded thereby during movement to the restraining position and does not, in and of itself, prevent the shoulder belt retractor from tensioning the shoulder belt across the occupant's chest; and a plastic comfort clip assembly positioned on the shoulder belt between the first buckle component and the stop, the comfort clip assembly being of a two-piece construction including an integral plastic comfort clip having a generally planar base that extends between the opposite edges of the shoulder belt in a generally parallel relationship with respect to the plane of this belt and having a pair of clamping portions integrally supported by the base so as to extend about the edges of the belt back toward each other and to terminate short of each other in a manner that defines a slot extending parallel to the longitudinal axis of the belt, and an integral plastic retainer having a generally planar base located between the clamping portions of the clip and the shoulder belt so as to close the clip slot and to thereby prevent an intermediate portion of the shoulder belt from moving back through the slot after insertion thereof into the clip through the slot such that the clip assembly is thereby held on the shoulder belt, the base and the clamping portions of the clip cooperating to clamp the shoulder belt therebetween with a force that is not so large as to prevent the clip assembly from being readily slid along the shoulder belt by a manual effort to provide adjustment thereof, the clamping force being sufficiently large to prevent the shoulder belt retractor from pulling the shoulder belt through the clip assembly, and the clip assembly engaging the stop to prevent movement therethrough so that appropriate manual adjustment of the clip assembly along the shoulder belt will prevent the shoulder belt retractor from tensioning the shoulder belt across the occupant's chest while in the restraining position.

2. In an automotive vehicle including an occupant seat having cushion and back portions, a restraint belt system for a seated occupant comprising:

lap and shoulder belts, a common first buckle component secured to adjacent first ends of the lap and shoulder belts, a second buckle component for selectively attaching the first buckle component so as to secure the belts in an occupant restraining position, the lap belt extending generally laterally with respect to the vehicle across the occupant's lap while in the restraining position, and the shoulder belt extending diagonally across the occupant's chest while in the restraining position;

means attaching the other end of the lap belt so as to secure the lap belt in the occupant restraining position;

an inertia locking type belt retractor receiving the other end of the shoulder belt so as to normally tension the shoulder belt across the chest of the belted occupant and to store the shoulder belt upon detachment of the buckle components;

a stop through which the shoulder belt passes, the stop being located toward the shoulder belt retractor with respect to the shoulder of the belted occupant over which the shoulder belt passes while extending diagonally across the occupant's chest in the restraining position, and the stop allowing the shoulder belt to be freely pulled in either direction therethrough so that the shoulder belt is not impeded thereby during movement to the restraining position and does not, in and of itself, prevent the shoulder belt retractor from tensioning the shoulder belt across the occupant's chest; and a plastic comfort clip assembly positioned on the shoulder belt between the first buckle component and the stop, the comfort clip assembly being of a two-piece construction including an integral plastic comfort clip having a generally planar base that extends between the opposite edges of the shoulder belt in a generally parallel relationship with respect to the plane of this belt, and a pair of clamping portions integrally supported by the base so as to extend about the edges of the belt back toward each other and to terminate short of each other in a manner that defines a slot extending parallel to the longitudinal axis of the belt, and an integral plastic retainer having a generally planar base located between the clamping portions of the clip and the shoulder belt so as to close the clip slot and to thereby prevent an intermediate portion of the shoulder belt from moving back through the clip such that the clip assembly is thereby held on the shoulder belt, and a pair of upstanding flanges extending away from the shoulder belt at the ends of the retainer so as to be located on opposite sides of the clip in longitudinally spaced relationship with respect to the belt, one of the retainer flanges engaging the clamping portions of the clip during adjustment of the clip assembly in either direction along the shoulder belt so that the retainer moves with the clip, the base and the clamping portions of the clip cooperating to clamp the shoulder belt therebetween with a force that is not so large as to prevent the clip from being readily slid along the shoulder belt by a manual force applied to the clip so as to provide adjustment of the clip position along the length of the shoulder belt, the clamping force being sufficiently large to prevent the shoulder belt retractor from pulling the shoulder belt through the clip, and the clip assembly engaging the stop to prevent movement of the clip assembly therethrough so that appropriate manual adjustment of the clip assembly along the shoulder belt will prevent the shoulder belt retractor from tensioning the shoulder belt across the occupant's chest while in the restraining position.

3. In an automotive vehicle including an occupant seat having cushion and back portions, a restraint belt system for a seated occupant comprising:

lap and shoulder belts, a common first buckle component secured to adjacent first ends of the lap and shoulder belts, a second buckle component for selectively attaching the first buckle component so as to secure the belts in an occupant restraining position, the lap belt extending generally laterally with respect to the vehicle across the occupant's lap while in the restraining position, and the shoulder belt extending diagonally across the occupant's chest while in the restraining position;

means attaching the other end of the lap belt so as to secure the lap belt portion in the occupant restraining position;

an inertia locking type belt retractor receiving the other end of the shoulder belt so as to normally tension the shoulder belt across the chest of the belted occupant and to store the shoulder belt upon detachment of the buckle components;

a stop through which the shoulder belt passes, the stop being located toward the shoulder belt retractor with respect to the shoulder of the belted occupant over which the shoulder belt passes while extending diagonally across the occupant's chest in the restraining position, and the stop allowing the shoulder belt to be freely pulled in either direction therethrough so that the shoulder belt is not impeded thereby during movement to the restraining position and does not, in and of itself, prevent the shoulder belt retractor from tensioning the shoulder belt across the occupant's chest; and a plastic comfort clip assembly positioned on the shoulder belt between the first buckle component and the stop, the comfort clip being a two-piece construction including an integral plastic comfort clip having
a generally planar base that extends between the opposite edges of the shoulder belt in a generally parallel relationship with respect to the plane of this belt, and
a pair of clamping portions integrally supported by the base so as to extend about the edges of the belt back toward each other in a manner that defines a slot extending parallel to the longitudinal axis of the belt, and an integral plastic retainer including
a generally planar base located between the clamping portions of the clip and the shoulder belt and defining a pair of elongated slots extending parallel to the belt length so that the retainer base has a configuration like a Roman numeral III, the ends of the clip clamping portions adjacent the clip slot being received within the slots of the retainer base so as to directly engage the shoulder belt, these ends of the clip clamping portions being engageable with the ends of the retainer base slots so that the retainer is moved with the clip during adjustment of the clip assembly along the length of the shoulder belt, and the central portion of the retainer case between its slots being positioned so as to close the clip slot in a manner that prevents an intermediate portion of the shoulder belt from moving back through the clip slot after insertion into the clip through this slot, the base and the clamping portions of the clip cooperating to clamp the shoulder belt therebetween with a force that is not so large as to prevent the clip assembly from being readily slid along the shoulder belt by a manual effort to provide adjustment thereof, the clamping force being sufficiently large to prevent the shoulder belt retractor from pulling the shoulder belt through the clip assembly, and the clip assembly engaging the stop to prevent movement therethrough so that appropriate manual adjustment of the clip assembly along the shoulder belt will prevent the shoulder belt retractor from tensioning the shoulder belt across the occupant's chest.

* * * * *